US006398460B1

(12) United States Patent
Eckel et al.

(10) Patent No.: US 6,398,460 B1
(45) Date of Patent: Jun. 4, 2002

(54) METHOD AND MEANS FOR HANDLING AND CONVEYING LOOSEFILL

(75) Inventors: Thomas G. Eckel, Milford; John W. Lakeman, Cincinnati, both of OH (US)

(73) Assignee: STOROpack, Inc., Cincinnati, OH (US)

( * ) Notice: Subject to any disclaimer, the term of this patent is extended or adjusted under 35 U.S.C. 154(b) by 0 days.

(21) Appl. No.: 09/967,247

(22) Filed: Sep. 28, 2001

Related U.S. Application Data

(62) Division of application No. 09/265,639, filed on Mar. 10, 1999, now Pat. No. 6,296,424.

(51) Int. Cl.$^7$ .................................................. B60P 1/60
(52) U.S. Cl. ...................................................... 406/41
(58) Field of Search ............................... 406/41, 90, 91, 406/122, 139, 145, 151

(56) References Cited

U.S. PATENT DOCUMENTS

| | | | | |
|---|---|---|---|---|
| 2,965,269 A | * | 12/1960 | Knutsen | 222/195 |
| 2,968,425 A | * | 1/1961 | Paton | 222/195 |
| 3,708,208 A | * | 1/1973 | Fuss | |
| 4,284,372 A | * | 8/1981 | Smith | |
| 4,411,674 A | * | 10/1983 | Forgac | 406/90 |
| 4,459,070 A | * | 7/1984 | Bourgeois | 406/90 |
| 4,799,830 A | * | 1/1989 | Fuss | |
| 5,108,673 A | * | 4/1992 | Wegmann | |
| 5,195,852 A | * | 3/1993 | Malugani et al. | 406/153 |
| 5,199,826 A | * | 4/1993 | Lawrence | 406/41 |
| 5,323,819 A | * | 6/1994 | Shade | |
| 5,413,855 A | * | 5/1995 | Izolastra et al. | |
| 5,623,815 A | * | 4/1997 | Hornstein et al. | |
| 5,639,188 A | * | 6/1997 | Howanski et al. | 406/151 |

* cited by examiner

Primary Examiner—Christopher P. Ellis
Assistant Examiner—Joe Dillon, Jr.
(74) Attorney, Agent, or Firm—Wood, Herron & Evans, L.L.P.

(57) ABSTRACT

Apparatus for handling loosefill and conveying the loosefill from one location to another comprises a container having a bottom and sides, the container being adapted to receive and contain therein a quantify of loosefill, a blower positioned at one end of the container, and conduit which channels air from the blower toward the other end of the container and which redirects the air back toward the one end of the container to thereby convey therewith the loosefill. A vacuum is positioned at the one end of the container which draws the loosefill out of the container. The container may be a trailer of a tractor trailer. A method of conveying loosefill from one location to another comprises providing a container of loosefill, providing an air source at one end of the container, directing air from the air source toward the other end of the container, and redirecting the air back towards the one end of the container to thereby convey therewith the loosefill to the one end of the container.

9 Claims, 3 Drawing Sheets

METHOD AND MEANS FOR HANDLING AND CONVEYING LOOSEFILL

This application is a division of Ser. No. 09/265,639 filed Mar. 10, 1999, now Ser. No. 6,296,424

FIELD OF THE INVENTION

This invention relates generally to loosefill cushioning material for protecting during shipping an item packaged in a box or carton, and more particularly to an efficient method and means for handling and conveying that loosefill.

BACKGROUND OF THE INVENTION

Loosefill, both plastic (expanded polystyrene) and starch-based, is a common cushioning material used to protect, during shipping, an item packed in a box or carton. The loosefill is shipped from the manufacturer to the customer, for example mail order house, in tractor trailers. Once at the customer, the loosefill must be removed from the trailer and stored by the customer for eventual use.

The present practice of unloading the trailer of the loosefill involves the truck driver or operator using a suction hose, normally 8–10 inches in diameter, to suck the loosefill from the trailer through the hose to a storage net in the customer's building. That person slowly walks the suction hose from the back of the trailer to the front of the trailer to suck out all the loosefill. This process typically takes about 45–60 minutes, and ties up the person emptying the trailer the entire time. In addition, the action of the person walking through the trailer necessarily generates dust and other airborne particles as the person crushes loosefill beneath his feet.

It would be desirable to have a process of unloading the trailer of loosefill which is quicker, does not require constant "baby-sitting" by a person, i.e. is automated, and which does not create dust and other airborne particles due to crushing the loosefill underfoot.

SUMMARY OF THE INVENTION

The present invention attains the stated objectives. In one aspect of the invention, apparatus for handling loosefill and conveying the loosefill from one location to another comprises a container having a bottom and sides, the container being adapted to receive and contain therein a quantity of loosefill, a blower positioned at one end of the container, and conduit which channels air from the blower toward the other end of the container and which redirects the air back toward the one end of the container to thereby convey therewith the loosefill.

In a preferred embodiment of this aspect of the invention, a first diverter extends from one end of the container to the other end of the container and diverts the loosefill toward the conduit. A second diverter is positioned so as to divert the loosefill around the blower and to the one end of the container. The conduit includes openings therein oriented so as to direct air escaping therefrom toward the one end of the container at an angle of between 0° and 90° relative to a longitudinal axis of the container. The angle is in a range of about 10° to 15°, and preferably is about 12.7°. The conduit extends from the one end of the container to the other end of the container and includes an upper surface which is sloped to prevent loosefill from gathering atop the conduit. The container may be a trailer of a tractor trailer or a storage net. A vacuum is positioned at the one end of the container which draws the loosefill out of the container.

In another aspect of the invention, a trailer has a bottom and sides and contains and hauls loosefill, and includes apparatus for handling and conveying the loosefill out of the trailer comprising a pair of blowers, one of which is positioned at each lateral side of the trailer and both of which are positioned at one end of the trailer, and conduit associated with each blower which channels air from the blower toward the other end of the trailer and which redirects the air back toward the one end of the trailer to thereby convey therewith the loosefill.

In a further aspect of the invention, a method of conveying loosefill from one location to another comprises providing a container of loosefill, providing an air source at one end of the container, directing air from the air source toward the other end of the container, and redirecting the air back towards the one end of the container to thereby convey therewith the loosefill to the one end of the container.

In a preferred embodiment of this aspect of the invention, the loosefill is diverted toward the returning air. The loosefill is diverted around the air source and to the one end of the container. The returning air is directed at an angle relative to the longitudinal axis of the container.

The invention provides the ability to unload a trailer of loosefill in approximately 30–40 minutes unattended, as opposed to 45–60 minutes attended. Unloading is thus quicker and the operator is freed up to pursue other tasks. Also, since the operator is no longer required to walk through the trailer of loosefill holding a suction hose, dust and other airborne particles are reduced thereby producing a cleaner unloading process.

These and other advantages of the present invention will become more readily apparent during the following detailed description taken in conjunction with the drawings herein, in which:

DETAILED DESCRIPTION OF THE INVENTION

Figure 1:
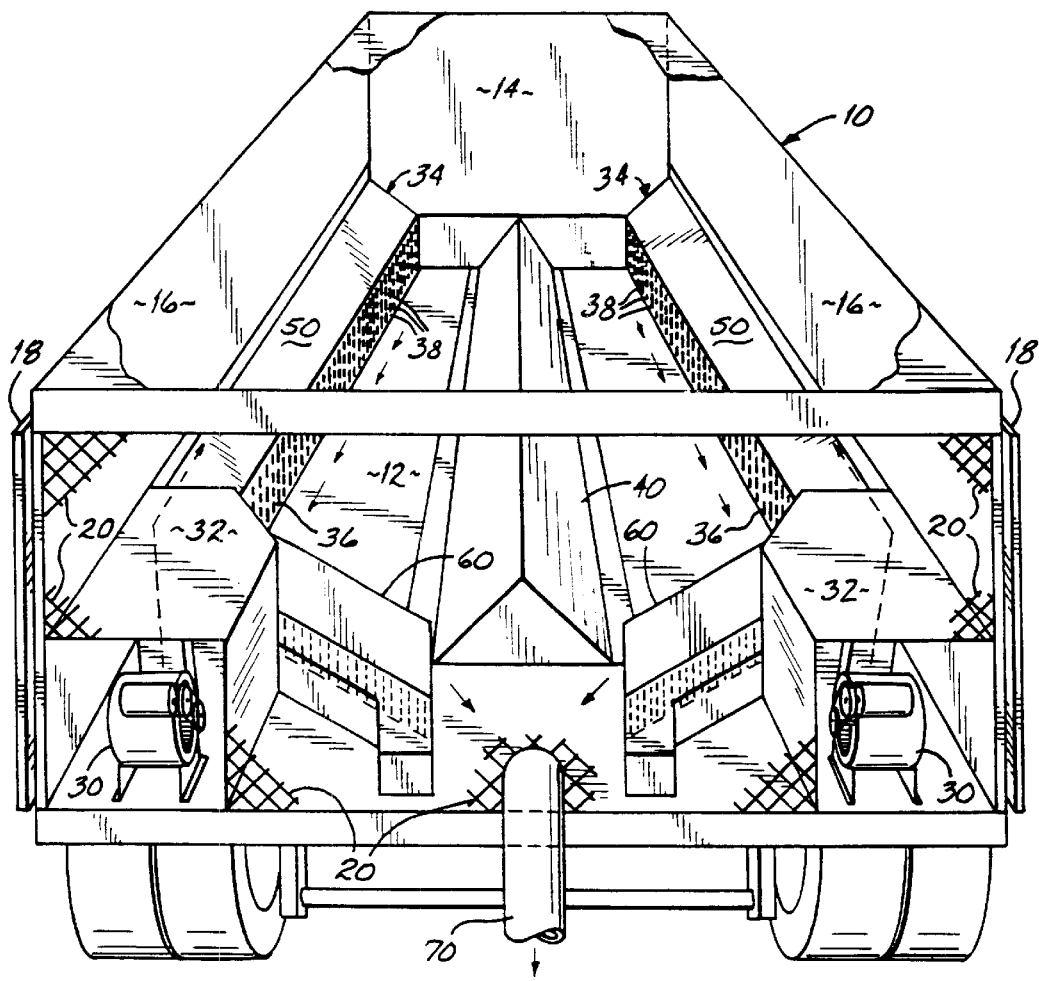
FIG. 1 is an end view into a trailer including apparatus of the invention for handling and conveying loosefill, i.e. unloading the loosefill, in the trailer.
Figure 2:
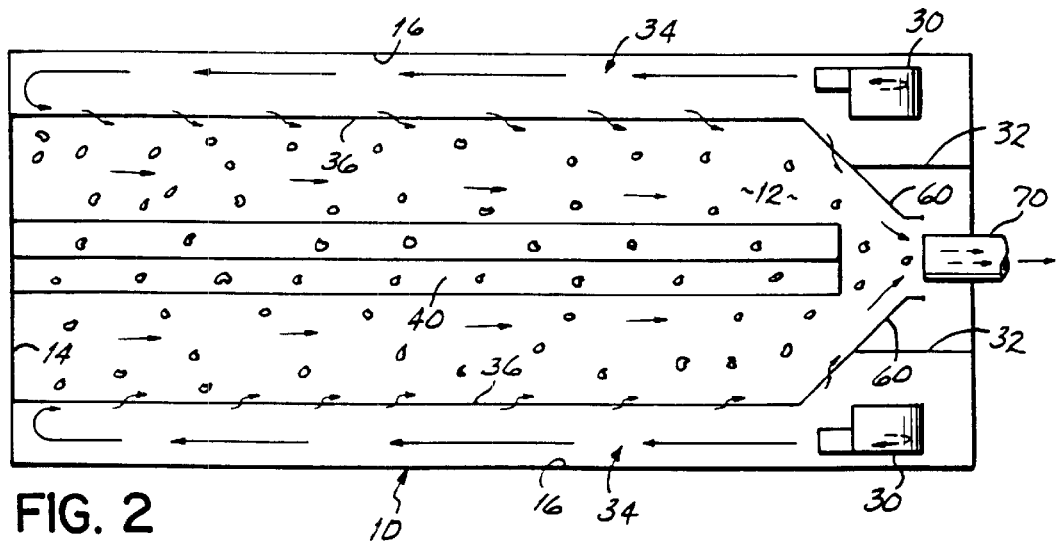
FIG. 2 is a top plan view of the trailer of FIG. 1.
Figure 3:
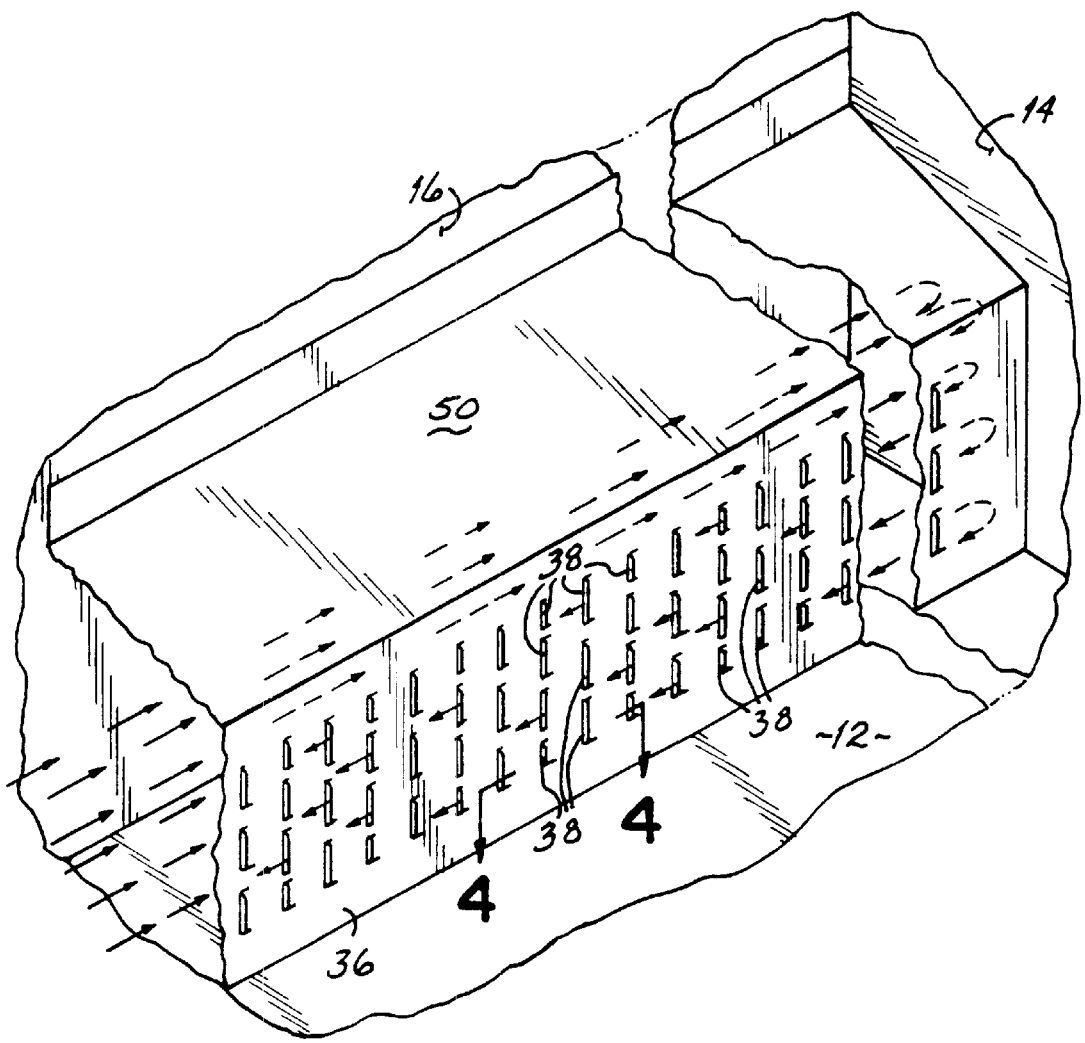
FIG. 3 is an enlarged partial perspective view of conduit in the FIG. 1 trailer which channels air from a blower toward the front end of the trailer and which redirects the air back toward the back end of the trailer to thereby convey therewith the loosefill out of the trailer.
Figure 4:
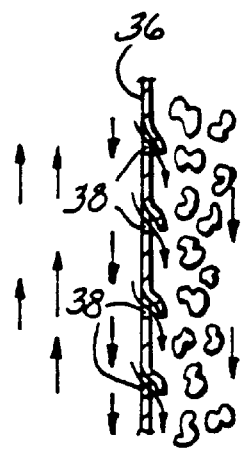
FIG. 4 is a view taken along line 4—4 in FIG. 3.

Referring first to FIGS. 1–4, there is illustrated a container in the form of a trailer 10 for hauling loosefill and which is outfitted according to the principles of the present invention. Trailer 10 may be a trailer of a tractor trailer, for example. The trailer 10 includes a bottom 12, a front end wall 14, a pair of side walls 16,16 and rear doors 18,18 which close the rear end of the trailer 10. Doors 18,18 are shown in their opened position, and reveal a screen or net 20 stretched across the rear end of the trailer 10 which contains the loosefill in the trailer 10 when the doors 18,18 are opened.

A pair of blowers 30,30 are mounted to the bottom 12 of the trailer 10 at the rear end thereof on either lateral side thereof. Each of the blowers 30 is preferably rated at 2 hp, 3000 scfm. Each of the blowers 30 is mounted within a shroud or housing 32, and directs air into a rectangular 9" by 12" conduit or duct 34 which channels air from its respective blower 30 toward the front end of the trailer 10 and which redirects the air back towards the rear end of the trailer 10 to thereby convey therewith the loosefill. More particularly, each of the conduits or ducts 34 includes on an inwardly facing panel 36 thereof a plurality of openings 38 oriented so as to direct air escaping therefrom toward the rear end of the trailer 10 at an angle of between 0° and 90° relative to a longitudinal axis of the trailer 10. Preferably, the openings 38 are at an angle in the range of about 10° to 15°, and most preferably are at an angle of about 12.7°. The openings 38 are generally rectangular in cross-section and are about 964" high and range in width from 1 ¼" to 1 ⅞41 to 2". In a preferred pattern, the openings 38 are in repeating vertical columns alternating in numbers of openings per column from 3 openings to 4 openings. Each of the columns with three openings includes three 2" wide openings, whereas each of the columns with four openings includes a top and bottom opening 1 ¼" wide and two middle openings each 1 ⅞" wide. The panel 36 is thus "louvered" in appearance, and is fabricated from 26 guage sheet metal. The balance of the panels making up each conduit or duct 34 are fabricated from 22 guage sheet metal.

To aid the conduits 34 in conveying the loosefill to the rear end of the trailer 10, a separator or diverter 40 is mounted to the floor 12 of the trailer 10 and extends generally from the rear end of the trailer 10 to tie front end of tie trailer 10. The diverter 40 is fabricated of 22 guage sheet metal and is in a triangular configuration, with the base of the triangle preferably being about 24" and each equal length leg of the triangle being about 21 ½". The triangular configuration of the diverter directs the loosefill laterally outward toward the conduits 34 as the level of loosefill drops in the trailer 10, as well as minimizes turbulence caused by the intersecting air flows from the conduits 34,34 at each lateral side of the trailer 10.

To further aid the conduits 34 in conveying the loosefill to the rear end of the trailer 10, each of the conduits 34 includes a sloped upper surface 50 which is sloped downwardly from a respective side wall 16 laterally inwardly, thereby preventing loosefill from gathering atop the conduits 34.

To still further aid the conduits 34 is conveying the loosefill to the rear end of the trailer 10, a second diverter 60 is associated with each of the blowers 30 so as to divert loosefill around a respective blower 30 and toward the rear end of the trailer 10. If desired, each of these second diverters 60 could be fabricated similar to the conduits 34 so as to include a sloped upper surface as well as openings to direct air from the blowers 30 toward the rear of the trailer.

Finally, to completely empty the trailer 10 of loosefill, the suction hose 70 which was heretofore manually carried by a person through the entire interior of the trailer 10 is positioned at floor level through the net 20 about 3–5 feet into the trailer. The loosefill is thus drawn into the suction hose 70 and is conveyed into a storage net in the customer's facility.

Figure 5:
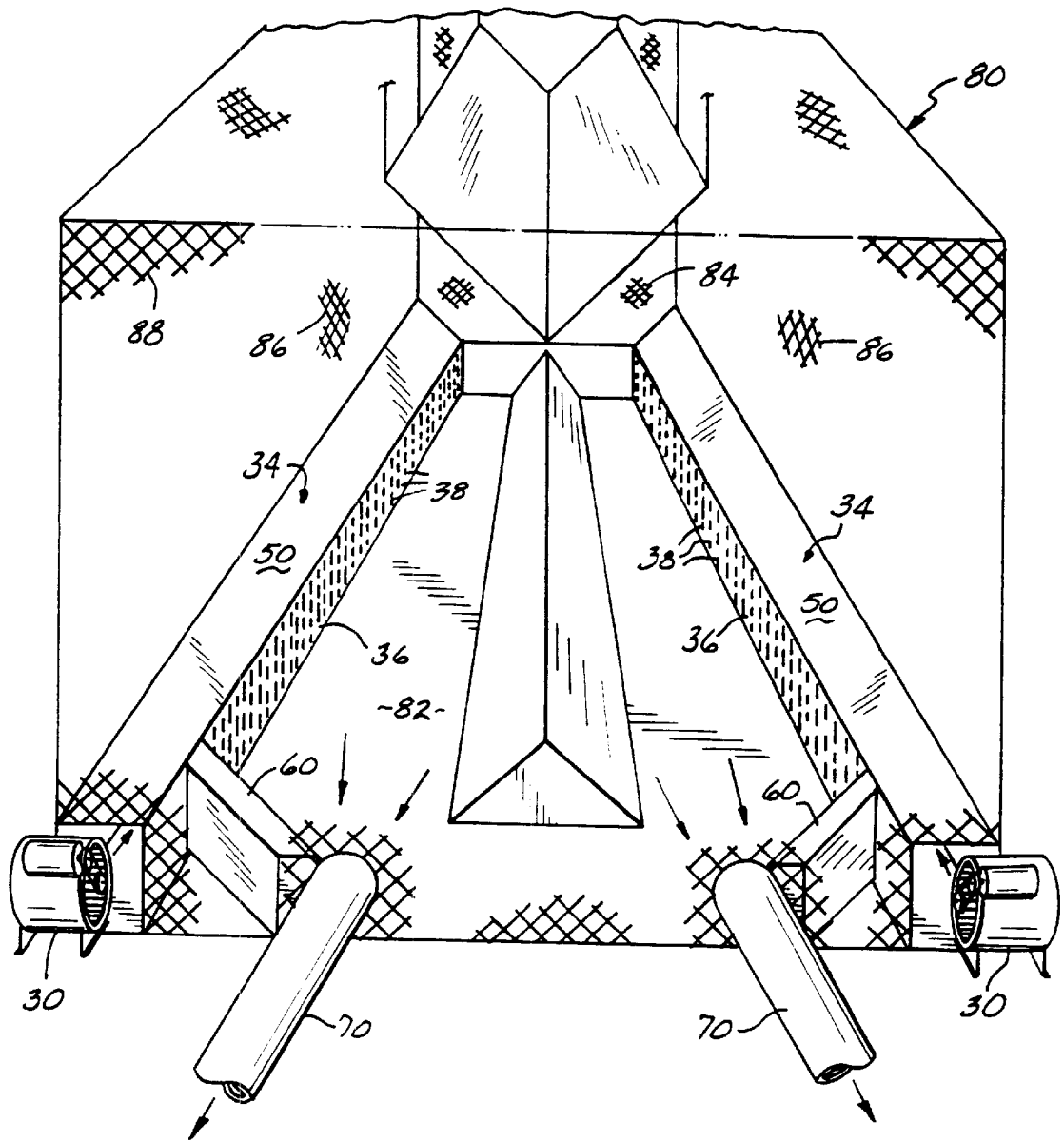
FIG. 5 is an end view into a loosefill storage net outfitted with the apparatus of the invention for handling and conveying, i.e. emptying the loosefill, in the storage net.

The present invention may also be used in conjunction with storage nets. Referring now to FIG. 5, and with like numbers representing like elements, a storage net 80 includes bottom 82, front 84, sides 86,86, and rear 88 screens or nets. The storage net 80 is outfitted in a manner similar to the trailer 10 referred to above with blowers 30, conduits 34 and separator or diverter 40. One or more suction hoses 70 are fitted through rear screen 88 to withdrawn loosefill from the storage net 80 conveyed to the rear end thereof by blowers 30, conduits 34 and separator/diverter 40.

Those skilled in the art will readily recognize numerous adaptations and modifications which can be made to the present invention which will result in an improved method and means for handling and conveying loosefill, yet all of which will fall within the spirit and scope of the present invention as defined in the following claims,

What is claimed is:

1. A trailer having a bottom and sides and for containing and hauling loosefill, said trailer including apparatus for handling and conveying the loosefill out of said trailer, said apparatus comprising:
   a pair of blowers, one of which i, positioned at each lateral side of said trailer and both of which are positioned at one end of said trailer; and
   conduit associated with each said blower which channels air from said blower toward an opposite end of said trailer and which redirects the air back toward said one end of said trailer, the redirected air conveying therewith the loosefill to said one end and out of said trailer.

2. The trailer of claim 1 further comprising a diverter which extends from said one end of said trailer to said other end of said trailer and which diverts the loosefill laterally outwardly toward said conduits.

3. The trailer of claim 1 further comprising a pair of diverters, one of which is associated with each of said blowers, and each of which is positioned so as to divert the loosefill around a respective said blower and to said one end of said trailer.

4. The trailer of claim 1 further comprising a first diverter and a pair of second diverters, said first diverter extending from said one end of said trailer to said other end of said trailer and which diverts the loosefill laterally outwardly toward said conduits, and each of said pair of second diverters, one of which is associated with each of said blowers, positioned so as to divert the loosefill around a respective said blower and to said one end of said trailer.

5. The trailer of claim 1 wherein said conduit extends from said one end of said trailer to said other end of said trailer and includes an upper surface which is sloped to prevent loosefill from gathering atop said conduit.

6. The trailer of claim 1 further comprising a vacuum at said one end of said trailer which draws the loosefill out of said trailer.

7. The trailer of claim 1 wherein said conduit extends from said one end of said trailer to said other end of said trailer and includes openings therein oriented so as to direct air escaping therefrom toward said one end of said trailer at an angle of between 0° and 90° relative to a longitudinal axis of said trailer.

8. The trailer of claim 7 wherein said angle is in a range of about 10° to 15°.

9. The trailer of claim 8 wherein said angle is about 12.7°.

* * * * *

UNITED STATES PATENT AND TRADEMARK OFFICE
CERTIFICATE OF CORRECTION

PATENT NO. : 6,398,460 B1
DATED : June 4, 2002
INVENTOR(S) : Eckel et al.

It is certified that error appears in the above-identified patent and that said Letters Patent is hereby corrected as shown below:

Column 1,
Line 5, "now Ser. No." should be -- now U.S. Patent No --.

Column 3,
Line 12, "964" high" should be -- 9/64" high --.
Line 13, "1 7/841" should be -- 1 7/8" --.

Column 4,
Line 19, "which i, positioned" should be -- which is positioned --.

Signed and Sealed this

Fifth Day of April, 2005

JON W. DUDAS
*Director of the United States Patent and Trademark Office*